G. W. TURNEY.
RADIATOR.
APPLICATION FILED MAR. 21, 1916.

1,225,895.                           Patented May 15, 1917.

Inventor
GEORGE W. TURNEY
By his Attorney

UNITED STATES PATENT OFFICE.

GEORGE W. TURNEY, OF ROME, NEW YORK, ASSIGNOR TO ROME-TURNEY RADIATOR CO., OF ROME, NEW YORK, A CORPORATION OF NEW YORK.

RADIATOR.

1,225,895. Specification of Letters Patent. Patented May 15, 1917.

Original application filed December 6, 1915, Serial No. 65,265. Divided and this application filed March 21, 1916. Serial No. 85,547.

*To all whom it may concern:*

Be it known that I, GEORGE W. TURNEY, a citizen of the United States, residing at Rome, Oneida county, State of New York, have invented certain new and useful Improvements in Radiators, the following being a full, clear, and exact disclosure of the one form of my invention which I at present deem preferable.

For a detailed description of the present form of my invention, reference may be had to the following specification and to the accompanying drawing, which illustrates my invention, wherein—

My invention relates to a radiator such as is used in automobiles, and involves a radiator-tube having a helical flange thereon in the form of a separate helix of edgewise wound copper secured to the outside of the tube by means of a line of solder extending longitudinally between the tube and the flange. In my application of December 6th, 1915, Serial Number 65,265, of which this application is a division, I have claimed a method of manufacturing a radiator-tube of this description. I intend to claim herein the radiator-tube itself.

Figure 1:
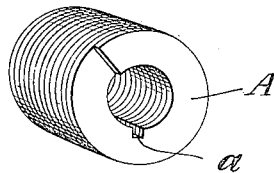
Figure 1 shows the helical flange in its original form.
Figure 2:
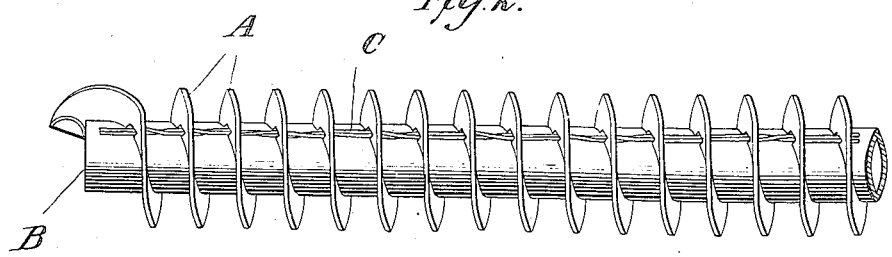
Fig. 2 shows the flange applied to the tube.

Referring to the drawing, A represents the flange as it is originally formed, being a closed coil of resilient metallic ribbon wound edgewise. B is the tube on which the coiled flange is placed and the convolutions distended as shown in Fig. 2, to the desired extent. The flange is then secured in its distended condition to the tube by means of a longitudinal cord of solder C laid in a recess between the tube and the inner periphery of the flange. In this case the recess is formed in the successive turns of the flange as indicated at $a$. The parts being in the relation shown in Fig. 2, heat is applied to melt the solder which adheres to the tube on the one hand and to the several convolutions of the flange on the other hand, so that the convolutions each become attached to the tube and are maintained thereon in their spaced relation as shown. It will be understood that the distention of the helix causes the several convolutions thereof to tightly grip the tube, so that the chief effect of the solder is to keep the convolutions spaced apart in their tube-gripping relation.

What I claim as new and desire to secure by Letters Patent is:

1. An improvement in radiators comprising a tube, a closed annular helix of resilient metallic ribbon coiled edgewise, each convolution having a recess in its inner periphery, the convolutions of said ribbon being distended along the tube, and a solder thread contained in said recesses and attaching said convolutions to said tube.

2. An improvement in radiators comprising a tube, a closed annular helix of resilient metallic ribbon coiled edgewise, each convolution having a recess in its inner periphery, said recesses being in alinement longitudinally of the tube, the convolutions of said ribbon being distended along the tube, and a solder thread contained in said recesses and attaching said convolutions to said tube.

In witness whereof I have hereunto set my hand, this 17th day of March, 1916.

GEORGE W. TURNEY.